Dec. 23, 1958    D. G. DAVIES ET AL    2,865,958
SULFONATION PROCESS
Filed June 20, 1957
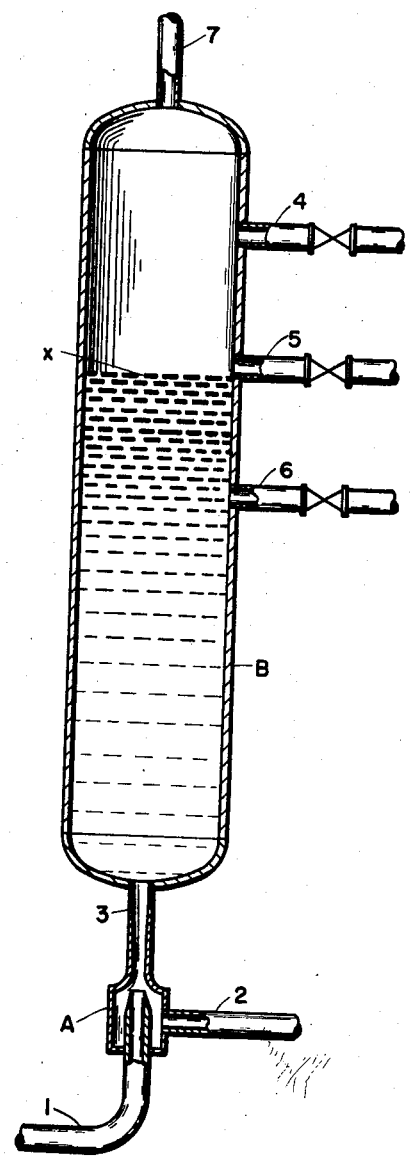
FIG. I
INVENTORS:
DONALD G. DAVIES
PETER PEPERZAK
BY: Alan C. Batchelder
THEIR AGENT

United States Patent Office 2,865,958
Patented Dec. 23, 1958

2,865,958

SULFONATION PROCESS

Donald Graham Davies and Peter Peperzak, Chester, England, assignors to Shell Development Company, New York, N. Y., a corporation of Delaware Application June 20, 1957, Serial No. 666,887

Claims priority, application Great Britain July 17, 1956

4 Claims. (Cl. 260—504)

This invention relates to a process for sulfonating organic compounds using sulfur trioxide as the sulfonating agent.

The art contains numerous proposals that sulfur trioxide be used for effecting sulfonation of various sulfonatable organic materials. In the earlier proposals, liquid or gaseous sulfur trioxide was introduced into a mass of the material to be sulfonated; usually, the entire mixture also was agitated thoroughly. This method of operation, however, was found to have several drawbacks: if mild conditions—i. e., low temperatures and low concentrations of sulfur trioxide—were used, low yields of sulfonic acids and low utilization of the sulfur trioxide resulted, while if more severe conditions—i. e., higher temperatures and/or higher concentrations of sulfur trioxide—were used, extensive side reactions occurred, resulting in the formation of useless tarry sludges.

More recently, United States Patent No. 2,523,582 proposes that organic materials be sulfonated by dispersing the material to be sulfonated into small liquid particles and contacting the dispersed particles with gaseous sulfur trioxide. In the preferred practice disclosed therein, a gaseous stream containing sulfur trioxide is employed to act as both the dispersing means and the sulfonating means, by directly the gaseous stream in the form of a jet on a liquid stream comprising the material to be sulfonated, as it issues from a nozzle, in such a way as to cause a fine dispersion of the liquid in the gas. The resulting dispersion then is passed into a free-space chamber wherein the gas and liquid phases are separated by gravity.

We have found, however, that markedly greater conversion of the sulfonatable materials to sulfonic acids and markedly greater utilization of the sulfur trioxide than are obtained by the process proposed by the cited patent result when the material to be sulfonated is dispersed in the form of very small droplets in a gas containing sulfur trioxide, the resulting dispersion is maintained for a very short period of time and thereafter is intimately contacted with a mass of the material to be sulfonated containing a substantial amount of the sulfonic acid reaction product. The product is obtained by withdrawing a part of the mass of the material to be sulfonated containing the sulfonic acid reaction product, and further treating the withdrawn material as necessary to recover the sulfonic acid product.

Thus, applying the process which embodies our discovery to a typical sulfonatable material, a petroleum fraction of the kind described in U. S. Patent No. 2,523,582, we have found that the conversion of the petroleum fraction to petroleum sulfonic acids is about triple that obtained when the sulfonation is conducted according to the process proposed in the patent; further, the utilization of the sulfur trioxide is substantially better than can be obtained according to the process of the patent. Our discovery thus provides a highly effective, operationally simple process for conducting the sulfonation of sulfonatable organic materials using sulfur trioxide as the sulfonating agent.

Our new process is applicable to the sulfonation of any of the materials known in the art to be directly sulfonatable. The nature, kinds and varieties of such materials are summarized in Kirk-Othmer, "Encyclopedia of Chemical Technology," Interscience, volume 13, 1954, in the section entitled "Sulfonation and Sulfation," beginning at page 317. Broadly, the suitable materials are the various alcohols, fatty oils, fatty acids, and various hydrocarbons, particularly the alkylated aromatic hydrocarbons present in some petroleum oils and fractions thereof, and various olefins.

Suitable alcohols are those described in Rose, "The Condensed Chemical Dictionary," Reinhold, 5th edition, 1956, at page 473, under the heading, "Fatty Alcohols."

The suitable fatty oils are described in detail at pages 332 and 333 of Kirk-Othmer, supra.

The term "fatty acids" is intended to define the usual acids included within this term. The fatty acids are described generically in Clark-Hawley, "Encyclopedia of Chemistry," Reinhold, 1957, at pages 380 and 381. Typical examples of this class of compounds, all of which are suitable in the process of this invention, are set out in Fieser and Fieser, "Organic Chemistry," Heath, 2d edition, 1950, at pages 408 through 414.

Of particular interest, because of the utility of the sulfonic acids which are formed therefrom, are the organic compounds containing at least one grouping of the type —CH=CH—. These compounds may be either aliphatic, including cycloaliphatic, or aromatic in nature. Mixtures of these compounds also are suitable. Of this general class, two sub-classes are of particular interest. The first of these sub-classes comprises the olefinically unsaturated compounds, including, for example, the alkenes such as ethylene, propylene, butylene, isobutylene, amylene, octene, decene, dodecene, tetradecene, hexadecene, octadecene and the like, cycloalkenes such as cyclopentene, cyclohexene and the like and aralkenes such as styrene, phenethylene and the like. Aliphatic hydrocarbons containing more than one unsaturated grouping (e. g., butadiene, pentadiene, cyclopentadiene, cycloheptatriene and the like) also are suitable in the process of the invention. The olefins containing from about 8 to about 22 carbon atoms are of particular value because of the utility of the sulfonic acids formed therefrom according to the process of the invention.

The second of these sub-classes comprises the aromatic compounds, such as those containing a benzene, naphthalene, anthracene, biphenyl or like structure. Of particular interest are the alkylated aromatic compounds such as toluene, ethylbenzene, dodecyl benzene, alkylated naphthalenes, alkylated anthracenes, alkylated phenanthrenes and the like. Those alkylated aromatic compounds in which the alkyl group or groups contain a total of from about 8 to about 22 carbon atoms provide sulfonic acids of particular value. These compounds often are obtained by the alkylation of benzene or toluene with trimers, tetramers or high polymers of propylene. Another source of alkylated aromatic compounds comprises the petroleum hydrocarbon oils and fractions thereof. See for example, pages 330 through 332 of Kirk-Othmer, supra. A preferred source of these alkylated aromatic compounds are the hydrocarbon oil fractions derived from naphthenic Gulf Coastal, Mid-Continent or California oils, and particularly the lubricating oil fractions obtained from such crudes. A naphthenic oil which is particularly useful for the preparation of valuable petroleum sulfonic acids by the process of the invention is a furfural or an Edeleanu raffinate of a naphthenic oil distillate, the raffinate having the following properties:

| | |
|---|---|
| Viscosity (SSU at 100° F.) | 400 to 900 |
| Viscosity index (V. I.) | 30 to 60 |
| Gravity (° API) | 22 to 27 |
| Refractive index (n 20/d) | 1.48 to 1.51 |
| Flash point (C. O. C., ° F.) | 380 to 450 |

Typical of such oil stocks are 30 V. I., 33 V. I. and 55 V. I. raffinates from solvent extracted distillates having a viscosity of 66 SSU at 210° F. derived from an 80/20 Poso/Coaling, a California, crude mixture. The solvents may be sulfur dioxide, furfural, phenol or the like.

If desired, the oil used may be, or may have been, pretreated with about 5-10% of its weight of 95-98% by weight sulfuric acid to remove a part of undesirable highly reactive materials present therein. In many cases, it may be convenient or even desirable to dilute the liquid to be sulfonated with an inert diluent. Thus, where an oil fraction is to be sulfonated, inclusion of a diluent may be desirable to reduce the viscosity of the liquid, or to modify other physical characteristics of the liquid. Also, inclusion of a diluent may be desirable to modify (e. g., to moderate or to promote) the action of the sulfur trioxide, or to provide added material which is of aid in control of the temperature. Suitable diluents for use where a petroleum fraction is being sulfonated include any low-viscosity substantially paraffinic and/or naphthenic normally liquid materials. Typical of this class of diluents is a paraffinic-naphthenic liquid material having a boiling range of from about 190° F. to about 220° F.—i. e., a light hydrocarbon naphtha. Where other materials are being sulfonated, other diluents may be more convenient. In general, the diluent chosen should be one which permits easy recovery of the sulfonation product. In some cases, a diluent which will evaporate in the dispersing means, or in the subsequent reaction zone(s) may be used to advantage in controlling the reaction temperature. Materials suitable for this purpose include such volatile but liquifiable alkanes as propane and butane, or sulfur dioxide.

Sulfur trioxide is used as the sulfonating agent in the new process. The sulfur trioxide may be derived from any suitable source; for example, it may be generated by heating liquid sulfur trioxide or by distilling oleum or by the oxidation of sulfur dioxide. The sulfur trioxide must be diluted with an inert gas. Preferably, the gaseous mixture employed contains from about 3 to about 25 parts by volume of sulfur trioxide and from about 97 to about 75 parts by volume of the inert gas. It is preferred that the gas mixture employed contain from about 5 to about 10% by volume of sulfur trioxide.

As the inert gas there may be used any gaseous compound which does not react with sulfur trioxide or the material to be sulfonated under the sulfonation reaction conditions. Suitable inert gases include air, carbon dioxide, nitrogen, carbon monoxide and sulfur dioxide. The mixture of sulfur trioxide, sulfur dioxide, nitrogen and oxygen obtained on the catalytic oxidation of sulfur dioxide with air is particularly suitable, inasmuch as such a mixture may be used directly and without modification in the process of the invention.

The sulfonation of the organic material is conducted according to the process of the invention by dispersing the organic material in the sulfur trioxide-containing gas, maintaining the resulting dispersion for a short period of time and then contacting the dispersion with a mass of the organic material containing a substantial amount of the sulfonation reaction product. Preferably, the sulfur trioxide-containing gas is used to disperse the organic material to be sulfonated in the sulfur trioxide-containing gas. Also, preferably, the dispersion of the liquid organic material in the sulfur-trioxide containing gas is contacted with the mass of the organic material in such a way that passage of the dispersion into and through the liquid mass causes thorough agitation of the liquid mass. Still further, preferably the amount and shape of the mass of liquid organic material is so chosen that substantially all of the sulfur trioxide is utilized in the sulfonation reaction and the effluent gases from the reactor contain substantially no sulfur trioxide.

Break-up of the liquid material to be sulfonated into very small droplets is accomplished by any of the means known in the art for breaking-up a liquid into very small droplets. Thus, such devices as spray nozzles, including pressure nozzles, fan nozzles, hollow-cone nozzles, solid-cone nozzles, impact nozzles, "fog" nozzles and rotating nozzles, gas-atomizing nozzles, and the like, may be used for this purpose. Suitable means for breaking-up a liquid into very fine droplets are set out and discussed in Perry, "Chemical Engineer's Handbook," McGraw-Hill, 3d edition, 1950, in the subsection thereof entitled "Spraying," pages 1169-1175. It is desirable that the droplets of the liquid be of such size as to provide a surface to volume ratio of at least about 100, and preferably the surface to volume ratio of the droplets is at least about 1000.

Dispersion of the droplets of organic material into the sulfur trioxide-containing gas is accomplished by any of the known means. In some cases, this means merely spraying the droplets into the gas; in other cases, it is desirable that the gas be thoroughly agitated as the droplets are introduced into it, thus aiding in dispersion of those droplets in the gas.

A particularly convenient and effective method for effecting the break-up of the liquid organic material into small droplets, with concurrent dispersion of those droplets into the sulfur trioxide-containing gas, is to use a gas-atomizing nozzle in which the liquid is broken up into very small droplets by impingement with a high-velocity stream of gas. By using the sulfur trioxide-containing gas as the gas employed in the nozzle to break up the liquid, dispersion of the droplets of the liquid in the gas is effected simultaneously with the formation of those droplets. This embodiment of the process of the invention is preferred.

An essential feature of the process of the invention is that the dispersion of the liquid material to be sulfonated in the sulfur trioxide-containing gas is maintained for a very short but significant period of time, and thereafter is intimately contacted with a mass of liquid material to be sulfonated containing a substantial amount of the product of the sulfonation reaction. The dispersion must be maintained as an entity—that is, no substantial coalescence of the droplets into larger droplets or continuous masses of liquid can be permitted—for at least about 0.01 second before the dispersion is contacted with the liquid mass, and usually it is preferred that the dispersion be maintained as an entity for at least about 0.05 second before it is contacted with the liquid mass. However, the time which elapses between the formation of the dispersion and contact of the dispersion with the liquid mass should not exceed about 5 seconds, and preferably does not exceed about 2 seconds. These requirements are most easily and effectively met by dispersing the liquid by means of a gas-atomizing nozzle, using the sulfur trioxide-containing gas as the dispersing agent, and ejecting the resulting dispersion into a chamber of restricted cross-section (such as a pipe) directly connected with the liquid mass, the chamber being of such length that the dispersion is maintained as an entity for the necessary length of time before it contacts the liquid mass.

The necessary intimate contact between the dispersion and the liquid mass is obtained by any of the usual methods—stirring, mixing, agitation or the like. However, it has been found that a particularly convenient and effective way of obtaining the necessary intimate contact is to introduce the dispersion into the liquid mass in such a way and under such conditions that the dispersion itself agitates the liquid mass. It is preferred that the contact is carried out in such a way that the sulfur trioxide is all consumed before the gas is permitted to separate from the liquid mass. A particular embodiment of the process of the invention in which the dispersion is contacted with the liquid mass under these conditions is shown in Fig. 1. In Fig 1, A is a gas-atomizing nozzle, B is an elongated cylindrical reactor. B is situated vertically, with A mounted below B and connected to the bottom thereof via a short pipe. The sulfur trioxide-containing gas is fed through pipe 1 to the gas-atomizing nozzle, A. The liquid to be sulfonated is fed to the nozzle via pipe 2. The dispersion effected in the nozzle is passed into and through pipe 3 into the bottom of reactor, B, which is filled to some level, $x$, with a mixture of the liquid to be sulfonated and the sulfonation reaction product. The dispersion is maintained for the necessary time before contact with the liquid mass by proper selection of the length and diameter of the pipe connecting A and B, and by controlling the rate at which the dispersion passes through the pipe. The level, $x$, is maintained by selection of the draw-off ports, 4, 5 and 6, and by the rate at which the liquid mass is drawn off through the selected port or ports. The withdrawal material contains the desired sulfonation product. The waste inert gas is withdrawn from reactor, B, through 7. In operation, the various process conditions, including the level, $x$, of the liquid mass, the relationship between the height of the liquid mass and the diameter of the reactor, B, and the rate at which the dispersion is introduced into the liquid mass, are all correlated so that the liquid mass is thoroughly and intimately contacted by the gaseous dispersion, yet so that the effluent gas passing out at 7 contains substantially no sulfur trioxide. It is to be understood that the particular embodiment of the process of the invention illustrated by Fig. 1, and described above, while preferred, is included only for the purpose of illustrating the invention, and is not intended to limit the invention in any manner not recited in the claims of this application.

The dispersing nozzle and the reactor may be operated at any convenient pressure, including both sub-atmospheric and super-atmospheric pressures. Operation at substantially atmospheric pressure is usually most convenient. Of course, where a reaction system such as that shown in Fig. 1, or other reaction system wherein the dispersion passes from the dispersing means into an empty chamber of restricted cross-section directly connected with the liquid mass, the pressure in such chamber and the rate at which the dispersion flows through that chamber must be such as to prevent flow of the liquid mass into such chamber and thus prevent interference by the liquid mass with formation and maintenance of the dispersion for the required period of time before it is contacted with the liquid mass.

The mass of the liquid material to be sulfonated containing the sulfonic acid product may be provided from an outside source, or it may be provided by the liquid material in the dispersion. In the preferred practice, a sufficient mass of the liquid-reaction product is provided, as by filling the reactor with the liquid, and the dispersion is then passed into contact with the liquid mass, the liquid material in the dispersion coalescing with and becoming a part of the liquid mass. By properly controlling the volume of the liquid mass, the rate of entry of the dispersion, the rate of withdrawal of the product and the amounts of sulfur trioxide and liquid material fed, the desired concentration of sulfonic acid product in the liquid mass and the desired complete utilization of the sulfur trioxide can be effected.

The sulfonation reaction preferably is conducted at temperatures not exceeding about 100° C., temperatures of from about 40° C. to about 90° C. being generally suitable. When the liquid to be sulfonated is a petroleum fraction, it is preferred to use a reaction temperature within the range of from about 50° C. and about 85° C. In the event that cooling is required, particularly in the time between formation of the dispersion and contact thereof with the liquid mass, such is easily effected by including in the liquid to be sulfonated or introducing into the dispersion as it is formed a volatile inert material, such as propane, butane or the like which on vaporization, cools the dispersion.

The ratio of sulfur trioxide to sulfonation feed stock should be maintained in the range of from about 26% to about 150%, and preferably between about 25% and about 75% of the weight of the sulfonatable material in the feed stock. Thus, where the feed stock is a petroleum fraction containing about 25% by weight of sulfonatable materials, the sulfur trioxide charged preferably amounts to from about 5% to about 20% of the weight of the feed stock charged. The amount of the liquid to be sulfonated maintained as the liquid mass with which the dispersion is contacted is not critical. In general, the amount of the liquid to be used will be determined by the geometry of the reactor, the nature of the liquid, the rate at which the dispersion is introduced thereinto, and other fractors. In all cases, it is desirable that the amount of the liquid used be such that the effluent gases from the reactor contain substantially no sulfur trioxide.

The concentration of the sulfonation product in the liquid mass likewise is not critical, provided that it is substantial. By this is meant that the liquid mass contain at least about 1-2% by weight of the sulfonation product. In most cases, particularly where the material to be sulfonated is a petroleum fraction, the amount of sulfonation product most conveniently is the maximum obtainable—that is, the amount corresponding to complete conversion of the sulfonatable materials therein to sulfonic acid product. In such cases, the liquid withdrawn from the reactor contains the maximum concentration of sulfonation product.

Recovery of the sulfonation product from the liquid withdrawn from the reactor can be effected by any of the methods known in the art. Where the material to be sulfonated is a petroleum fraction, U. S. Patent No. 2,523,582 provides one method for recovering the desired products U. S. Patent No. 2,578,657 provides still another method. Kirk-Othmer, supra, describes various methods for the recovery of petroleum sulfonic acids, and for recovery of the reaction products of the sulfonation of other materials.

It will be noted that our new process is admirably suited to continuous operation, and in the preferred practice of this process, the liquid material to be sulfonated and the sulfur-trioxide containing gas are both continuously passed to a gas-atomizing nozzle wherein the liquid is dispersed in the gas, the resulting dispersion is continuously passed through a free-space zone of such dimensions as to provide maintenance of the dispersion for the necessary time, the dispersion then is continuously contacted with a mass of the liquid containing the sulfonic acid reaction product and a part of that mass is continuously withdrawn as product.

The foregoing constitutes a general description of the invention, illustrated by a particular embodiment thereof. The invention is further illustrated by the following examples, showing application of the process in particular instances. These examples are provided only for the purpose of further illustrating the invention, and are not intended and are not to be construed as limiting the invention in any way not recited in the claims.

*Example 1*

A mineral lubricating oil having a viscosity of 140 seconds Redwood at 100° F. was pretreated with 10% by weight of sulfuric acid (95% by weight $H_2SO_4$) at ambient temperature for 15 minutes and then separated from the sulfuric acid. This pretreated oil was then passed to pipe 2 of the apparatus shown in Fig. 1. The oil was atomized in the gas-atomizing nozzle by a stream of gas containing 7% by volume of sulfur trioxide. The sulfur trioxide-containing gas had been prepared by passing a mixture of sulfur dioxide and air, in stoichiometric proportions, over three beds of vanadium pentoxide contained in stainless steel reactors heated in a furnace to 490–520° C. The rates of flow of the oil and sulfur trioxide-containing gas were such that the weight of sulfur trioxide fed was 7.3% of the weight of the oil fed. The reactor, B, was filled with a column of the oil to be sulfonated containing the maximum amount of petroleum sulfonic acids possible under the conditions used. The height of the column of oil was adjusted so that the effluent waste gases from pipe 7 contained substantially no sulfur trioxide. The column of oil was maintained at a temperature of 56° C. The product withdrawn from the reactor was allowed to settle and the oil layer was separated from the settled sludge. The oil layer had an acid value of 35 milligrams of KOH per gram of oil.

The sulfonic acids in this oil were converted to sodium sulfonates by treatment of the oil with aqueous caustic soda solution. The yield of sodium sulfonates based on the pretreated oil was 20.8%.

*Example II*

The procedure of Example I was repeated, except that the amount of sulfur trioxide fed was 11.85% of the weight of oil fed and the temperature of the column of oil was maintained at 80° C. The sulfonated oil separated from the sludge had an acid value of 44.6 milligrams of KOH per gram. The final yield of sodium sulfonates based on the pretreated oil was 18.25%.

In both of the foregoing examples, the gaseous effluent issuing from the reactor was substantially free of sulfur trioxide, so that the whole of the sulfur trioxide fed has been used in the sulfonation reaction.

*Example III*

The advantages of the process of the invention over the process proposed in U. S. Patent No. 2,523,582, are shown by the fact that when the procedure of Example I was repeated, except that the dispersion of oil in the sulfur trioxide-containing gas in pipe 3 was passed into a large empty tank which permitted immediate separation of the liquid and gas phases by gravity, the yield of sodium sulfonates based on the pretreated oil was but 6.6%, and the effluent gases contained a substantial amount of sulfur trioxide.

It is thus evident that our new process results in markedly greater conversion of the sulfonatable materials to sulfonic acids, with greater utilization of the sulfur trioxide, than are obtainable with the process proposed in U. S. Patent No. 2,523,582. In fact, the conversions obtained in the new process amount to about triple those obtainable by the prior are process.

We claim as our invention:

1. In a process for sulfonating a sulfonatable organic material by contacting the material in the form of very small droplets with a gas containing sulfur trioxide, in the form of a dispersion of the droplets in the gas, separating the gaseous and liquid portions of the resulting mixture and recovering sulfonic acid product from the separated liquid, the improvement which consists of maintaining the said dispersion of the organic material in the sulfur trioxide-containing gas for from about 0.01 second to about 5.0 seconds and thereafter contacting said dispersion with a mass of the said organic material containing at least 1% by weight of the sulfonic acid reaction product.

2. The process according to claim 1 wherein the sulfonatable organic material contains the group —CH=CH—.

3. The process according to claim 1 wherein the sulfonatable organic material is a petroleum hydrocarbon fraction.

4. In a process for sulfonating a sulfonatable oganic material by contacting the material in the form of very small droplets with a gas containing sulfur trioxide, in the form of a dispersion of the droplets in the gas, separating the gaseous and liquid portions of the resulting mixture and recovering sulfonic acid product from the separated liquid, the improvement which consists of discharging the said dispersion, within from 0.01 to about 5.0 seconds time after it has been formed, into and intimately contacting it with a mass of the said organic material containing at least 1% by weight of the sulfonic acid reaction product.

References Cited in the file of this patent

UNITED STATES PATENTS 2,691,040    Bloch et al. _____ Oct. 5, 1954